United States Patent [19]

McGregor et al.

[11] Patent Number: 5,325,418

[45] Date of Patent: Jun. 28, 1994

[54] CELLULAR PHONE ACCOUNTING SYSTEM

[75] Inventors: Donald S. McGregor; Gregory M. McGregor, both of San Ramon, Calif.

[73] Assignee: Telemac Cellular Corporation, Danville, Calif.

[21] Appl. No.: 767,231

[22] Filed: Sep. 27, 1991

[51] Int. Cl.⁵ ................... H04M 11/00; H04Q 7/00
[52] U.S. Cl. ......................... 379/59; 379/58; 379/60; 379/91; 455/33.1; 455/33.2
[58] Field of Search ................. 379/58, 59, 60, 91, 379/144; 455/33.1, 33.2

[56] References Cited

U.S. PATENT DOCUMENTS

| | | | |
|---|---|---|---|
| 4,839,829 | 6/1989 | Freedman | 379/96 |
| 4,951,308 | 8/1990 | Bishop et al. | 379/91 |
| 5,046,188 | 9/1991 | Molnar | 379/201 |
| 5,127,041 | 6/1992 | O'Sullivan | 379/63 |
| 5,138,650 | 8/1992 | Stahl et al. | 379/91 |
| 5,144,649 | 9/1992 | Zicker et al. | 379/59 |

Primary Examiner—Stephen Chin
Assistant Examiner—Vijay Shankar
Attorney, Agent, or Firm—Bielen, Peterson & Lampe

[57] ABSTRACT

A cellular telephone accounting system includes an integrated hardware system interlinking a cellular telephone unit, a telephone interlink receiver, and a central processing unit connected to the interlink receiver. The hardware system also preferably includes a receipt printer and a credit card reader. The cellular telephone unit is equipped with an internal real time clock and calendar circuit and memory store to record the time and date of calls for reporting to the central processing unit to enable tracking and detailed accounting of calls.

18 Claims, 8 Drawing Sheets

Microfiche Appendix Included
(6 Microfiche, 543 pages)

CELLULAR PHONE ACCOUNTING SYSTEM

BACKGROUND OF THE INVENTION

This specification includes an Appendix comprising computer code listings which will be substituted by a microfische Appendix.

This invention relates to a cellular telephone accounting system to track the location and usage of cellular phones and to provide an automatic accounting system for centralized record keeping, audit or account statements. The cellular telephone accounting system is particularly useful for rental of cellular phones where mobility of the phone presents unique problems in customer billing and accounting for the location and possession of the telephone unit. Similarly, the accounting system is useful for organizations with shared resources and equipment shared by employees, as in large private companies or government agencies. Frequently, in such organizations usage of mobile cellular telephones requires monitoring to insure appropriate distribution and authorized use of the phones. In both situations means is provided for determining where the phones have been, what calls have been made and when, and to whose account usage is to be attributed. Additionally, the organizations may desire means for determining what general account such use, including any service charges from outside vendors, should be charged.

Because existing commercial cellular phones are generally sold to a user/owner, detailed accounting schemes have been avoided in part to minimize complications with the already complicated requirements for crediting national or international communication carriers, local or regional carriers, and one or more cellular network area operators. Similarly, with multiple charges from multiple carriers, with services provided in a variety of governmental jurisdictions, tax accounting becomes a complex endeavor. With the factor of periodic use by a series of multiple users added, problems arise that cannot be resolved solely by programming changes in existing telephone units or central communication systems. While some of the features of the preferred embodiment described hereafter may be of the type that could be incorporated in central telephone service systems, inertia in altering massive communication protocols for selective applications, not of benefit to all subscribers, will inhibit implementation. Although other cellular telephone rental systems have been proposed, they have been unable to provide the full features required for proper monitoring of the location and usage of a mobile telephone unit to allow adequate flexibility in setting usage criteria for an organization or appropriate charge schedules for a rental business.

The cellular phone accounting system of this invention solves the problems in expanding the capability of existing cellular phone systems by improvements in software programming and hardware additions, which are preferably integrated into a composite system that is useful for small and large organizations.

SUMMARY OF THE INVENTION

The cellular telephone accounting system of this invention is preferably embodied in an integrated hardware system interlinking a cellular telephone unit, a telephone interlink receiver, and a central processing unit connected to the interlink receiver. The hardware system also preferably includes a receipt printer, particularly when used as a rental operation for cellular phone units. The cellular telephone unit is equipped with internal real-time clock and calendar circuit and memory store to record the time and date of calls for reporting to the central processing unit to enable tracking and detailed accounting for calls.

In centralized organizations, where one or more dispensing locations are contemplated, the central processing unit may comprise local processors, such as personal computers, connected by a file server network to a personal computer acting as a centralized information processor, or to a central mainframe or minicomputer. Alternately, multiple local processors may be periodically accessed by a centralized processor through a modem using commercial communication lines for data transfer.

In the preferred embodiment described, the system will include a credit card reader for credit verification, and, a receipt printer for instant production of statements, primarily useful for rental operations, but useable by organizations where computer record keeping is augmented by paper tracking. In such situations, slips identifying the user and other facts associated with checking-out and checking-in procedures for the mobile units may be useful at the dispensing location although charges and other usage accounting is handled internally in a centralized data processing system in coordination with other organizational accounting tasks.

The primary object of this invention is to devise a system that is sufficiently flexible to enable a variety of customized tracking procedures to be incorporated into a customized cellular phone operation where a plurality of mobile telephone units are involved. The cellular telephone accounting system of the described, preferred embodiment includes all those needed features for a mobile telephone rental enterprise, and may be modified as desired for less complex operations that may be appropriate for internal governmental or private company operations.

The cellular telephone accounting system of this invention includes a plurality of interlinked components. In general, a plurality of mobile telephone units or cellular phones are involved, although the system could be used to monitor the use of a single telephone unit. The mobile telephone units, each comprise a cellular phone including conventional circuitry and software to perform the customary communication transmission and reception functions. The units also include hardware and software means for call metering for coordinating call charges to national and regional phone systems in conjunction with one or more commercial cellular service operators. In addition, the mobile telephone unit of this invention includes a real time clock and calendar circuit module in each phone unit to date and time the calls and enable accurate coordination of phone usage with the location of use for enhanced billing detail or usage monitoring.

The phone unit, when dispensed and returned, is installed in the telephone interlink receiver which includes a boot having a terminal connector or interface that connects to the external service connector of the phone unit. Ordinarily, the phone unit connector is the standard connector of a premodified cellular phone, which enables hardwire communication, i.e.: power and data transmission between the phone unit and an external system. This connector is usually used to diagnose, service or reprogram the cellular phone.

It should be noted that the telephone unit is modified to include a clock/calendar chip. In addition to the existing integrated circuit found within commercial phones, such clock/calendar information is stored with the conventional information pertaining to the phone number called and the like.

The telephone interlink receiver functions as the computer telephone interface and enables a standard personal computer to communicate with the internal signal and data processing circuits of a minimally modified phone unit. In such an intermediary capacity, the interlink receiver assists the processing unit, preferably a personal computer, in accomplishing basic housekeeping functions for the phone unit such as setting the time and date of the phone unit, reprogramming the phone unit, or, retrieving stored information necessary to calculate charges. Together with the processing unit, the interlink receiver determines other aspects of a phone's function and use or restrictions in the function and use, appropriate for a rental service.

The telephone interlink receiver utilizes an internal microprocessor and interfacing means for interconnecting the telephone unit and the central processing unit. The translation means is also included for establishing protocol relative to the signals received from the telephone unit to permit communication of telephone unit signals to the microprocessor and, eventually, to the central processing unit. The translation means may be programmed with software or firmware appropriate to the particular phone unit or cellular phone. The translation means may be erasable or reprogrammable at will, commensurate with the telephone unit being employed in the present invention. It is to be understood that the circuiting comprising the interlink receiver can be incorporated into the phone unit with the interlink receiver merely functioning as an interconnector between phone and computer, with the phone jacked directly into the serial port of the computer.

The central processing unit in the preferred embodiment comprises a dedicated personal computer that is programmed with the necessary control routines to operate the system. In general the central processing unit is a stand-alone component and need not be connected to a centralized information processor.

However, if one or more local central processing units are connected to a centralized processor the operating protocol can be such that operations management is shared between the centralized information processor and the linked central processing unit or units. In this manner certain functions may only be performed through the centralized processor, such that global or system wide changes can be effected from a single source, or, in some situations, to prevent or limit inadvertent or unauthorized alterations to system operation or billing records at the local level.

The central processing unit includes connected peripheral components, most importantly a receipt printer which can generate a detailed instant rental invoice or slip incorporating a rental agreement. On return of a rented cellular phone unit the printer can generate a return agreement with an instant statement of charges, including charges from commercial common carriers, cellular network operators and, importantly, rental schedule charges. With the improved capability of the subject system the latter accounting can include special charges for use out of the home base system, (roaming charges), for use in distant zones with a distant home base, as defined by the rental operator, real time charges, and other extraordinary charges or surcharges based on the newly available information generated by the subject improvements to cellular phones.

Because the cellular phone unit is an expensive item and is an instrument that can incur substantial long distance charges, additional peripheral equipment for automatic credit card reading can be included for verification of credit sufficient to sustain loss of a phone unit or potentially high commercial carrier charges during use. The credit card reading equipment is connected to the central processing unit to transfer credit information to storage, verify credit by a modem that accesses a credit bureau and prepare credit card statements after authorization of charges. The credit verification means is used in conjunction with any programmed charge limiting criteria, or call limiting criteria, for restricting phone use to insure payment. These and other features of this invention will be described in greater detail in the detailed description of the preferred embodiment of this specification.

DESCRIPTION OF THE PREFERRED EMBODIMENTS

Figure 1:
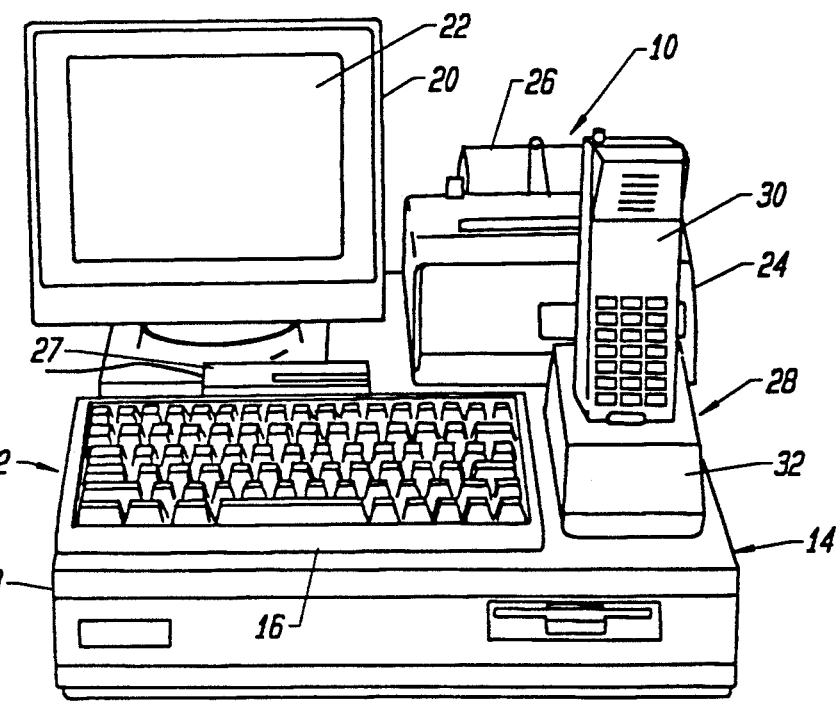
FIG. 1 is a perspective view of the components of a first embodiment of a cellular phone accounting system.

Referring to FIG. 1, the cellular telephone accounting system of this invention is designated generally by the reference numeral 10 and is shown in the configuration of a stand-alone, tracking and accounting unit 12. The tracking unit 12 includes a central processing unit 14 that combines a data entry keyboard 16 coupled to a controller or data processor 18 which in turn is coupled to a monitor 20 having a display screen 22 for tracking data entry and review. Also connected to the processor 18 are peripheral components including a printer 24, here with a continuous paper roll 26 for printing statements, receipts, customer contracts and the like, and a credit card reader 27 for credit verification.

Included in the cellular telephone accounting system is a telephone interlink receiver 28 shown with a coupled, hand-held, cellular phone unit 30. The interlink receiver 28 structurally forms a boot 32 into which the cellular phone unit 30 is inserted at the time of check-out or rental, and at the time of check-in or return. The interlink receiver 28 comprises the interface component between the central processing unit 14 and the mobile cellular phone 30. It is to be understood that the tracking unit 12, even as a stand alone system, generally includes a plurality of phone units 46, each with its own telephone number and equipment identification number and assigned cellular area system number.

Figure 2:
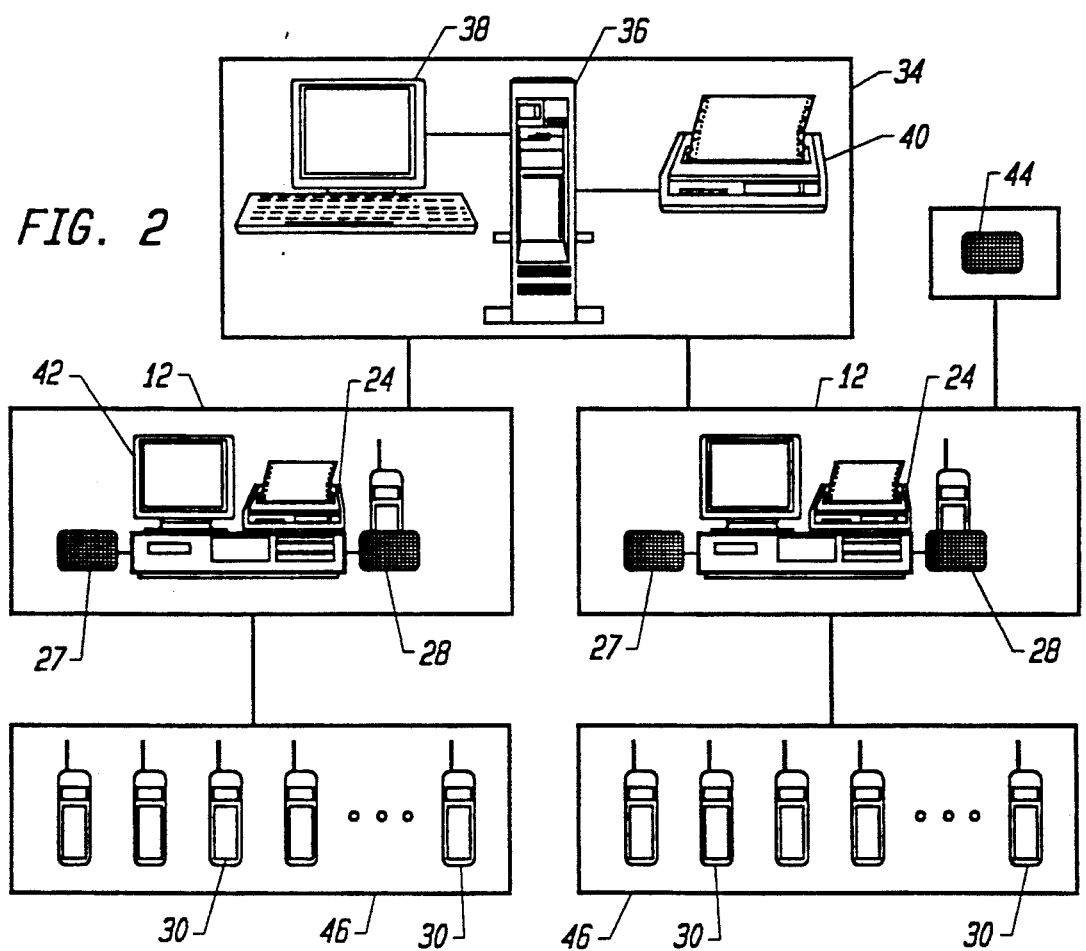
FIG. 2 is a schematic illustration of a second embodiment of the cellular phone accounting system with a centralized processor.

As shown in FIG. 2, the preferred system for a rental operation having multiple rental sites includes a centralized processor 34, including a controller 36 with a large memory acting as a centralized database for record keeping, an input/output console 38 for entering data and reviewing files, programs, etc. and a printer 40 for generating reports and hard copy records. The centralized processor should comprise at least an IBM 386 or equivalent personal computer with an internal modem and large memory. The centralized processor 34 removes many of the operational tasks from the plurality of local tracking units 12, enabling the tracking units to provide the necessary operations for site rentals, but removing to the centralized processor the programming and scheduling functions.

In this manner, changes in rate structures, in procedures or in the type of information collected can be accomplished throughout the served system. Additionally, centralizing many operations removes the ability to inadvertently or deliberately tamper with procedures or billings and allows implementation of various security measures for the local sites.

Each of the tracking units 12 comprises a personal computer 42 such as an IBM 286 or compatible, a rental agreement and invoice printer 24, and a credit card reader 27. The tracking units 12 are connected to the telephone interlink receiver 28 to which phone units from the inventory 46 are connectable to link the phones with the computer 42. The tracking units communicate with the centralized processor continually by a file server type network or periodically by a modem link through commercial telecommunication systems. A second dedicated modem, (not shown) located internally in the computer 42 also allows the credit card reader to communicate with a service bureau 44 for credit verification.

A cellular phone unit inventory 46 is associated with each tracking unit 12 and includes individual phone units 30 identified for assignment to a particular tracking unit home base. Records of reassignment of phone units when returned to different sites or when transferred to more popular rental sites is desired for proper inventory control. Internal systems programming tracks the phone units and includes procedures to track the location of the units during use. To insure that roaming charges are appropriately calculated relative to a particular home base, cellular area system identification numbers are stored on each call or periodically when switching from one area to another.

Figure 3:
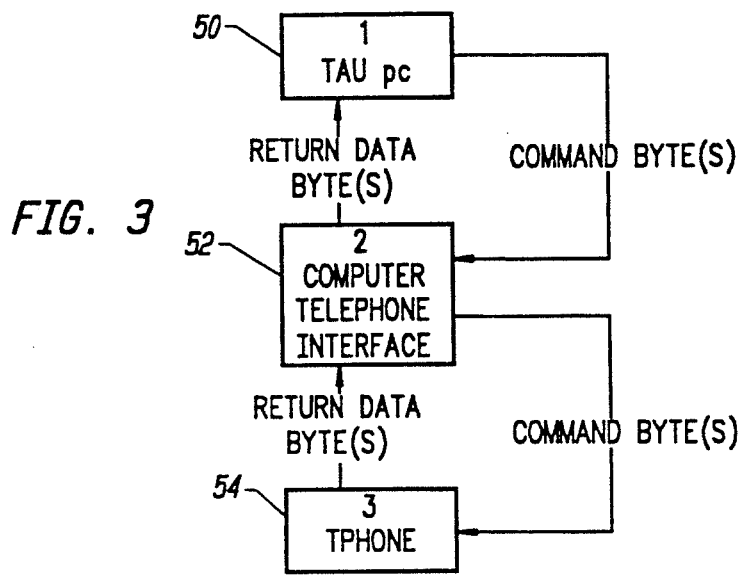
FIG. 3 is a schematic block diagram of the command hierarchy of the major components of the system.
Figure 4:
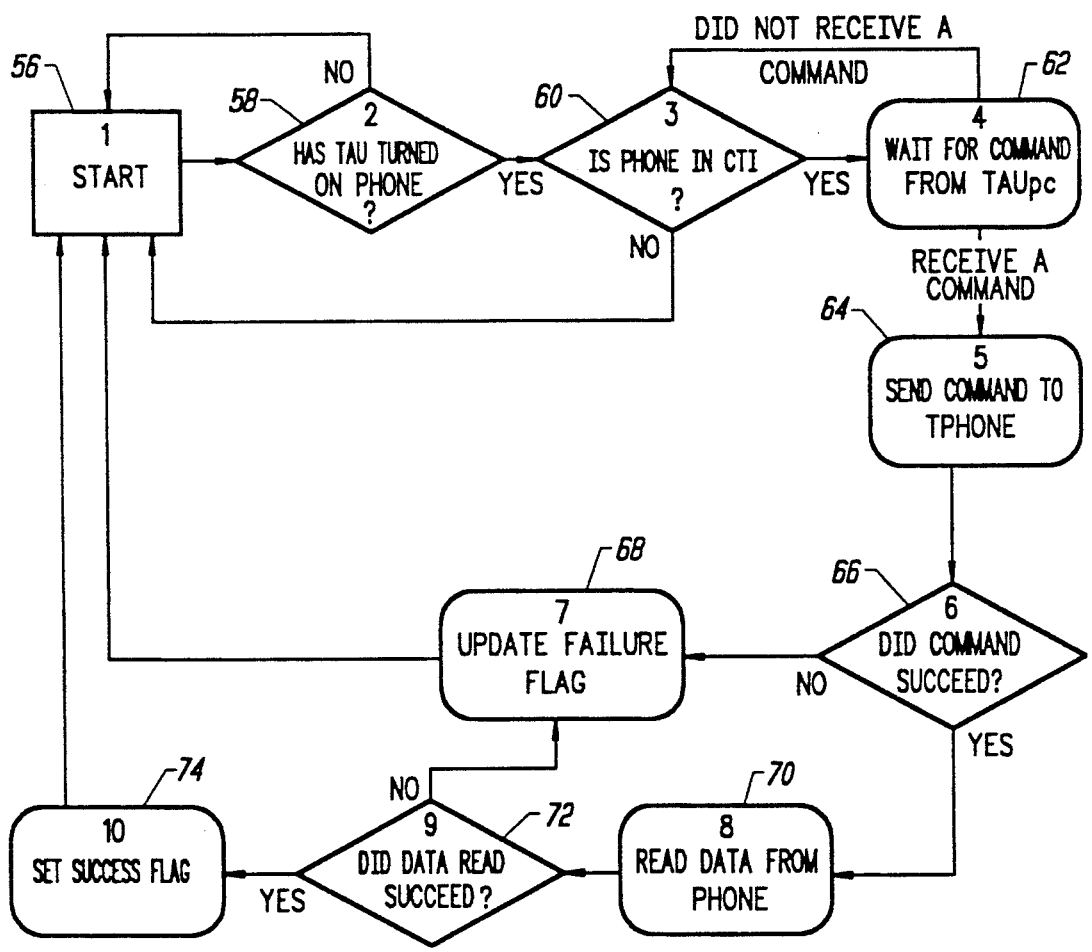
FIG. 4 is a schematic block diagram of the command line interface between the computer and interlink receiver.
Figure 5:
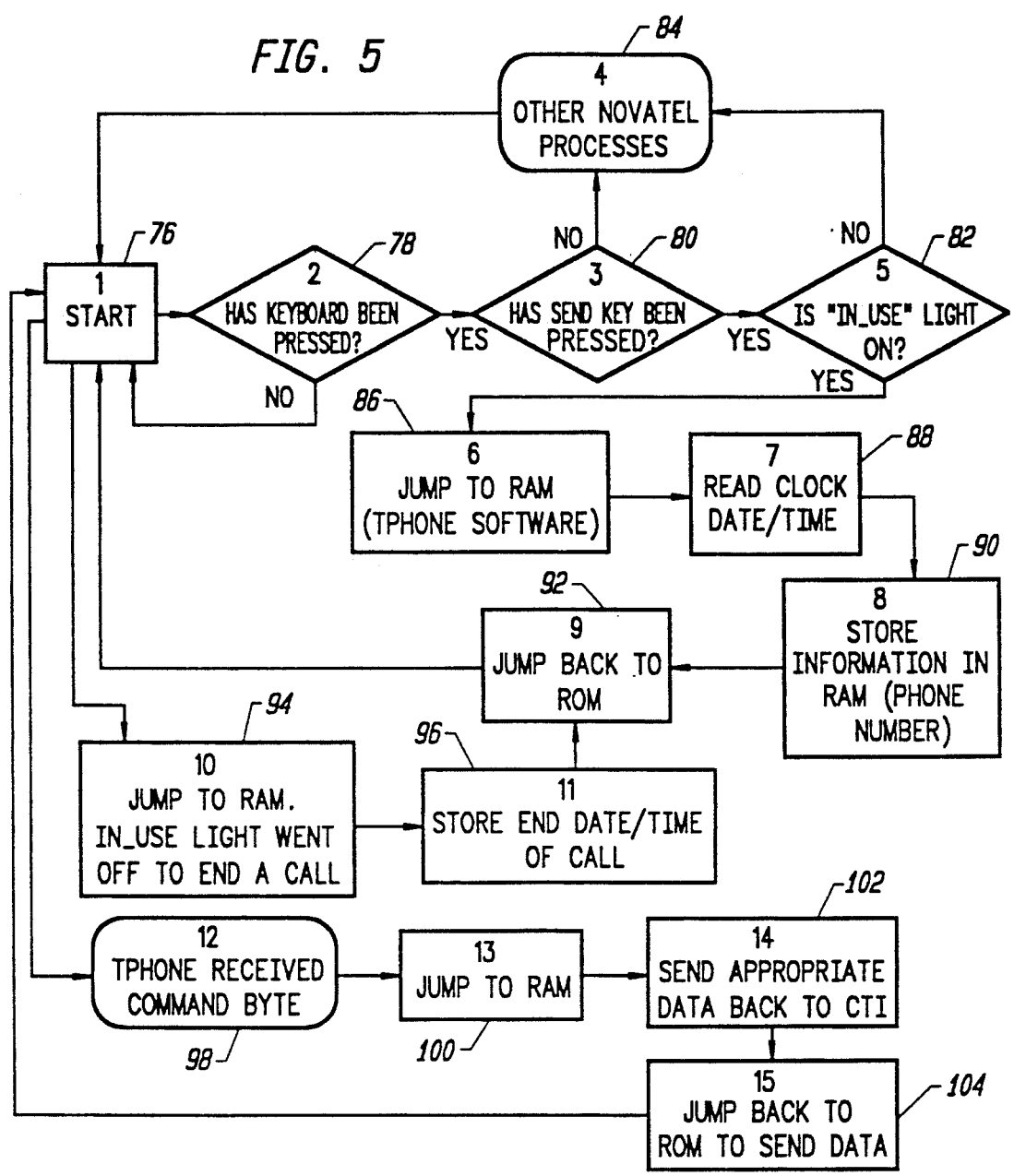
FIG. 5 is a schematic block diagram of the command line interface between the interlink receiver and the cellular phone unit.

Referring now to the schematic diagrams of FIGS. 3-5, an overview of the operation of the interlinked components of the cellular telephone accounting system 10 is shown. In FIG. 3, the command hierarchy is depicted with the tracking and accounting unit 12 (TAU), box 50, sending command bytes to the computer telephone interface (CTI) box 52, in the form of the previously described telephone interlink receiver 28, which translates and relays the appropriate command bytes to the Tphone, box 54, which is one of the cellular phone units 30 electronically connected to the interlink receiver 28.

Figure 8:
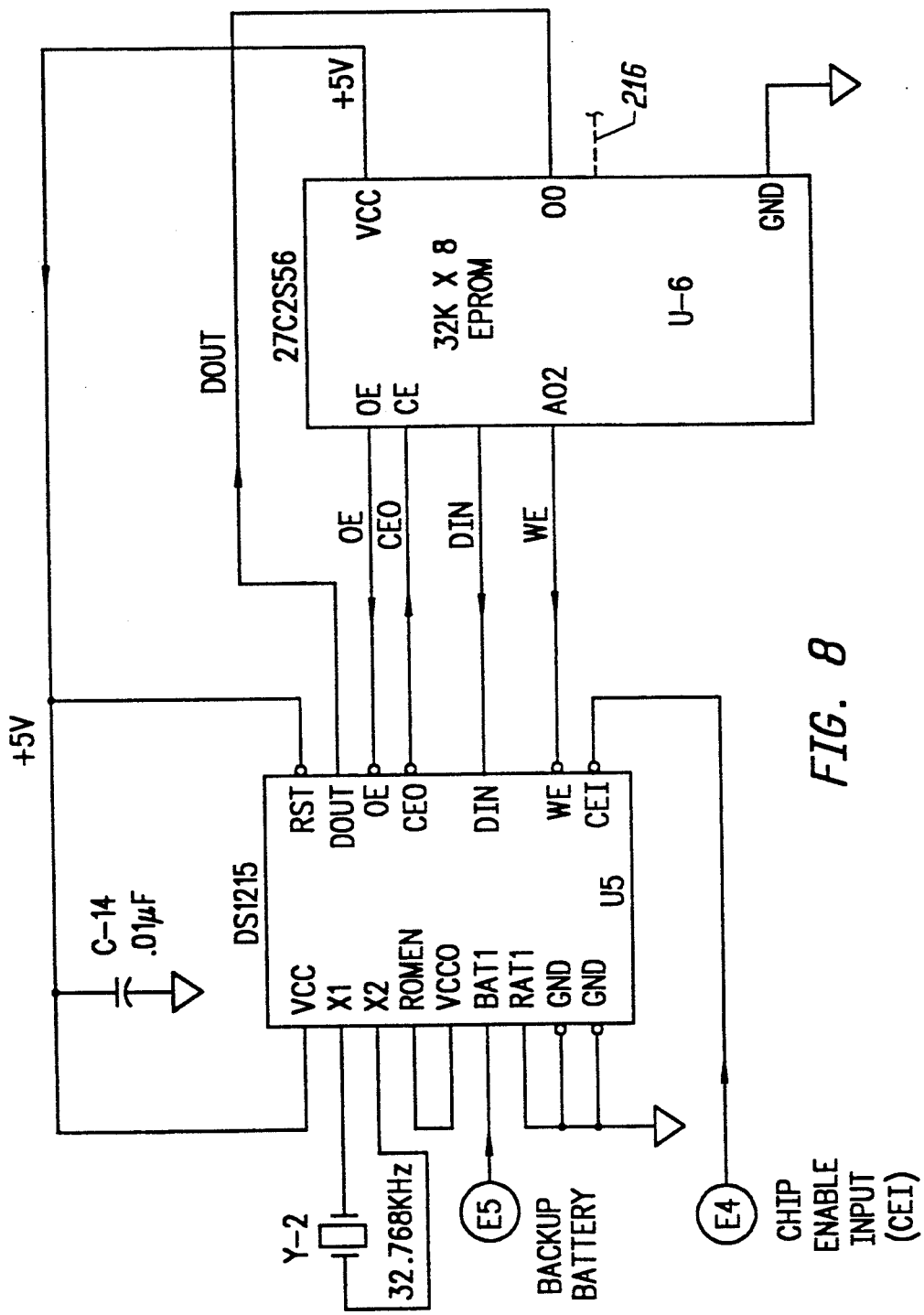
FIG. 8 is an electrical schematic depicting a portion of the telephone unit circuitry and modifications made to the same.

In an exemplar system, a Novatel PTR800A cellular phone was modified by inclusion of a real-time clock chip, U5 in FIG. 8, integrated into the cellular phone processor with a rededication of a part of the memory store in the cellular phone EPROM memory chip to accommodate operating system code and data storage for the new functional capabilities of the phone unit.

The computer initiated command bytes, when engaged in data retrieval, are relayed to the Tphone 54 by the CTI 52, with any modification or translation, necessary to accommodate particular operating system and data code in a particular manufacture of cellular phone, triggering a data dump or data read of stored information and check of any settings such as the real time clock and non-resettable cumulative counter. The data retrieved by the CTI 52 is passed to TAU with any modification or translation to the data necessary for compatibility with the interface standards set for the TAU system particularly in a multi site network where differently configured phones may be used from site to site.

The return data bytes are processed by the TAU computer, for site activities involved in the rental transaction, and in systems having a centralized processor, stored and passed to the centralized processor when the local unit is periodically interrogated by the centralized processor.

Referring to FIG. 4, a simplified command protocol is diagrammed to outline the data retrieval process at the CTI. At the start, box 56, an inquiry is made to determine if the TAU has turned on the Tphone for interrogation, decision diamond 58. If no, it returns to its start state. If yes, then an inquiry is made to determine if the cellular phone is in the CTI, diamond 60, and engaged on the connecting terminal to be electronically connected to the CTI. If yes, then the system is set to receive a command from the TAU, box 62. When a command is received the TAU relays the command to the Tphone, box 64 and a check is made to determine if the Tphone received the command, diamond 66. If no, a failure flag update message, box 68, is relayed to the TAU, and if yes, the read data message is passed to the Tphone, box 70, to extract the desired information from the Tphone.

If the data read is a success as queried at diamond 72 the success flag is set, box 74, and if no, the failure flag is set. A failure flag message will prompt the rental operator to remove the phone from service for repair servicing or special procedure interrogation to recover any sought for data, particularly if Tphone is being interrogated after a rental return.

Referring to FIG. 5, a simplified command protocol is diagrammed to outline the procedure occurring in the modified cellular telephone. It is expected, however, that the subject modifications will be incorporated in the cellular telephone upon manufacture.

From start, box 76, one of several paths is directed to the decision diamond 78 where it is determined whether a telephone call is being initiated. If no, a return loop goes back to start, box 76. If yes, it is determined if a send key has been pressed at diamond 80 which indicates an outgoing call. If yes, a check is made at diamond 82 to determine if the "in use" light E-1 FIGS. 7A-7D, is on, indicating a completed call connection. A no at either the send key decision or light on decision will result in looping to existing internal phone processes at box 84 with a return to a start, box 62.

If the phone is in use the interrogation path jumps to RAM where the control code for initiating the internal record keeping procedures resides, box 86. Instruction are initiated to read the clock and calendar, box 88, and retrieve any cellular system identification number and switching data, if the phone is not already storing such data in its own memory. The recovered data is temporarily stored in reallocated RAM, box 90 together with the phone number and other pertinent data for feedback to the CTI callup. The path then jumps back to ROM, box 92, for coordinating system operation procedures of cellular phone with the real time data collection and store before returning to start, box 76.

In a second path from start, box 76, when the in use light goes off signalling the end of a call, the jump to RAM, box 94 initiates the program instructions to store the time and data of the call end, box 96, enabling calculation of an outgoing call duration or identification of the time and date of an incoming call together with the cellular system identification number, if desired. A jump back to ROM 92 returns the control to the internal control circuitry of the phone.

Finally, on placing the phone in the interlink receiver 28, a telephone received command byte, box 98 results in a jump to RAM, box 100 where the program instructions to recover and relay the stored data are initiated. This stored data, including the cellular system identification number in the cellular network system, stored in RAM, is sent back to the CTI, box 102 using the system protocol of the phone unit, box 104.

If the cellular system identification numbers are logged by the existing operating system program of the phone, the newly programmed interrogation instructions need only locate the data store, recover and transmit the data to the CTI for relay to the TAU. The TAU by its own modifiable internal program defines use zones and translate cell locations to use zones for calculation of use surcharges, for out of home base roaming calls, and/or, for monitoring the location of use. Alternately to monitor use, the real-time clock circuit can trigger periodic inquiries to the memory store of current system identification number and record changes in the number in a memory location accessible during data transfer.

In a mobile, cellular telephone network, cellular areas are given a system identification area number (SID) similar to national telephone system area codes. Each phone in addition to an assigned telephone number includes a unit identification number or called the Electronic Serial Number (ESN) and an initially assigned home system identification number (SIDH) that identifies the unit as associated with a particular cellular area (SID). Usually this SIDH is the rental site as the home base from which roaming calls are calculated, but may be another location. In the metering of calls, for proper crediting of the systems area operator, calls are logged with (SID) number providing a means of noting from which system area, as well as area code, a call is made, while "roaming" away from a home base. In that manner, the phone companies can bill a cellular phone wherever it travels.

By storing and accessing this information and coordinating data with real time call records, monitoring the location of the phone unit during its period of use is accomplished by any of several programming procedures.

Figure 6:
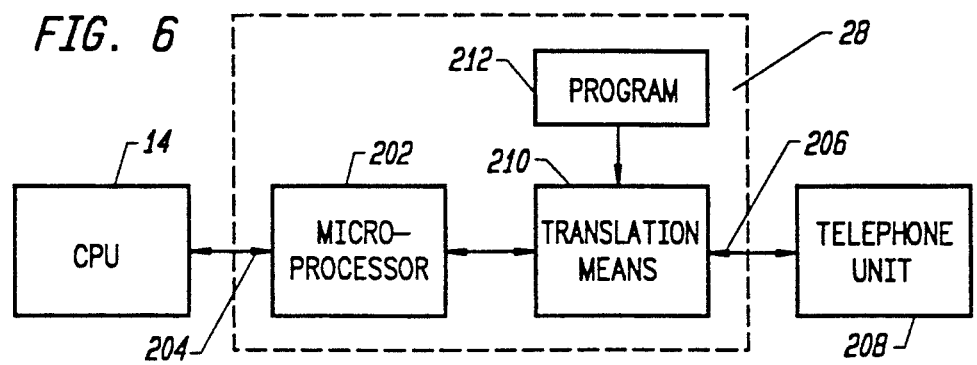
FIG. 6 is a block diagram indicating a general flow of data through the telephone interlink receiver.
Figure 7A:
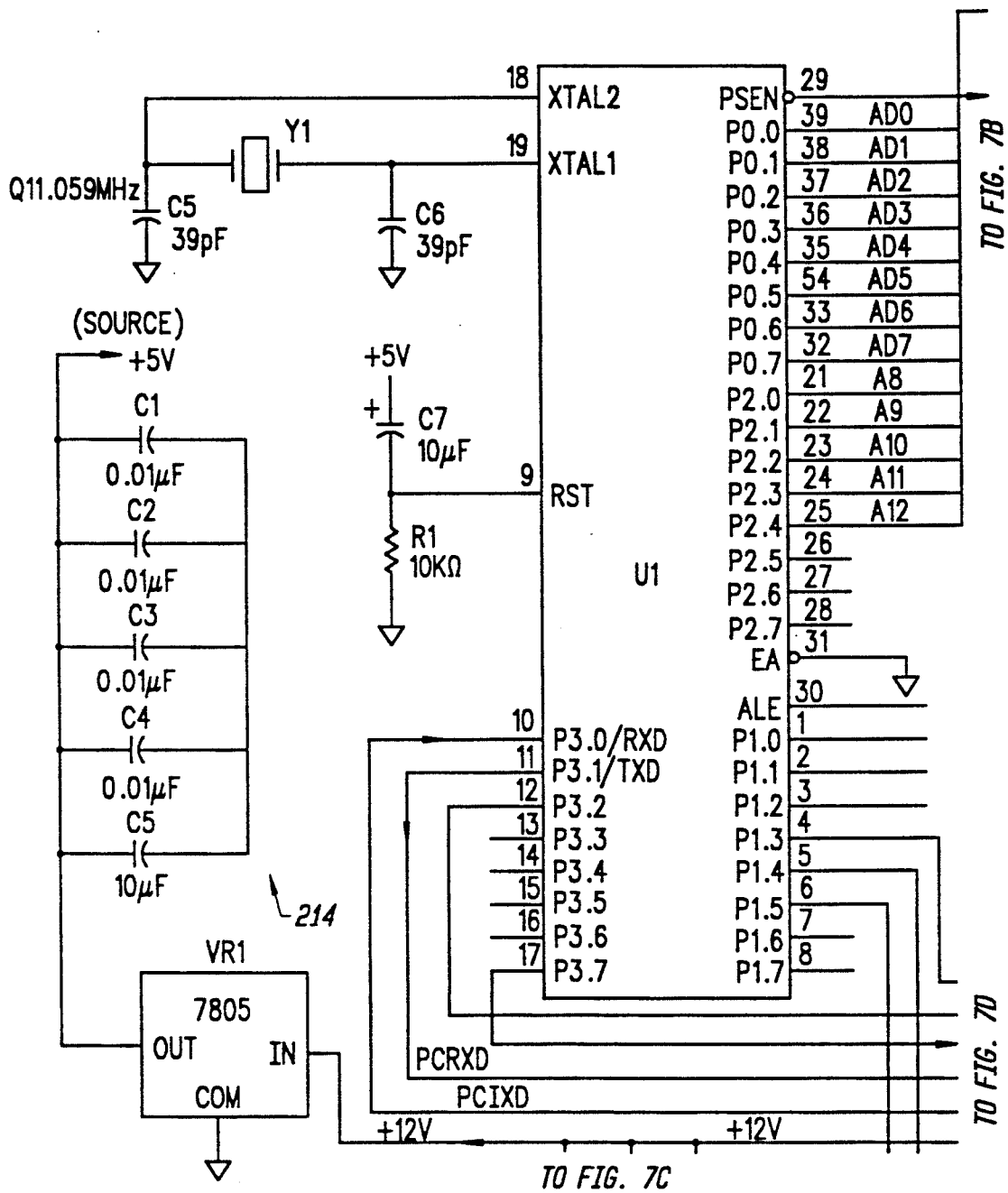
FIGS. 7A-7D are an electrical schematic of the telephone interlink receiver and the interfaces between the telephone unit and central processing unit.
Figure 7B:
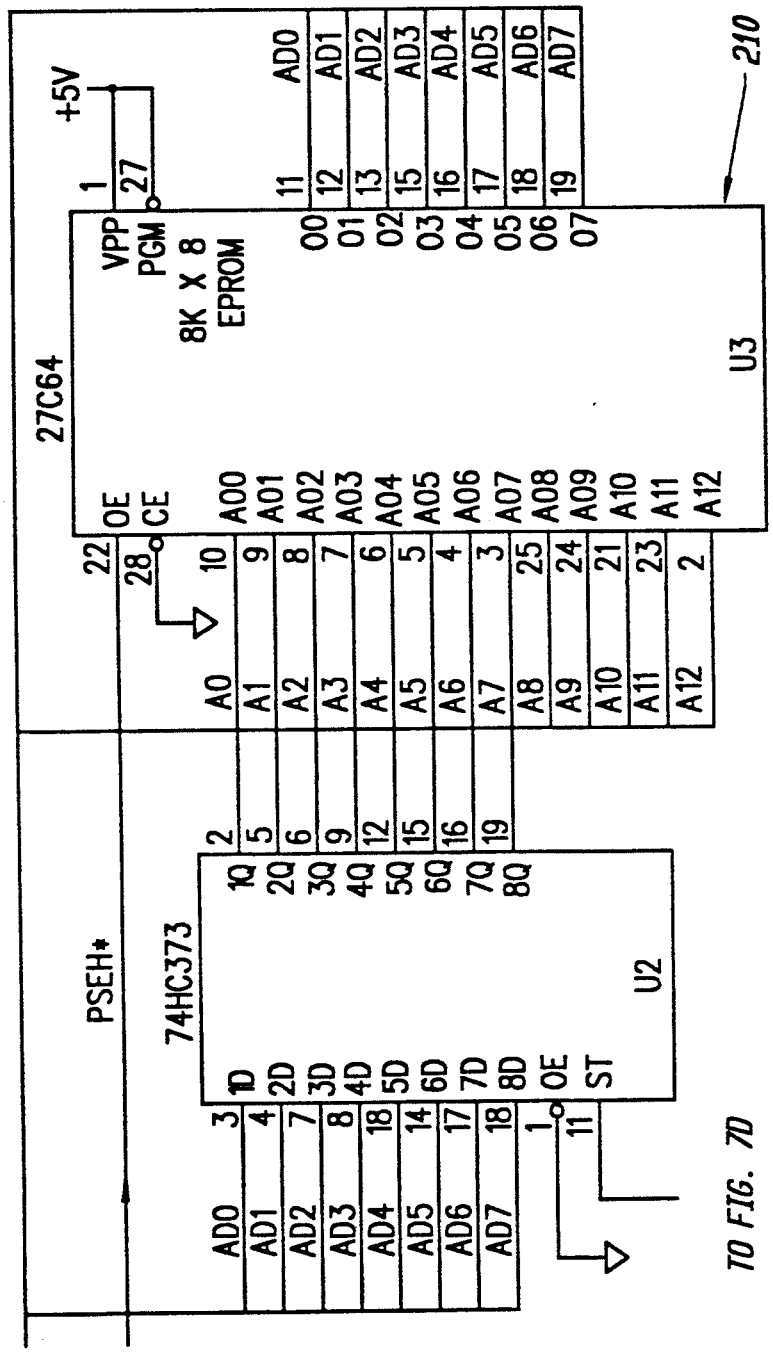
Figure 7C:
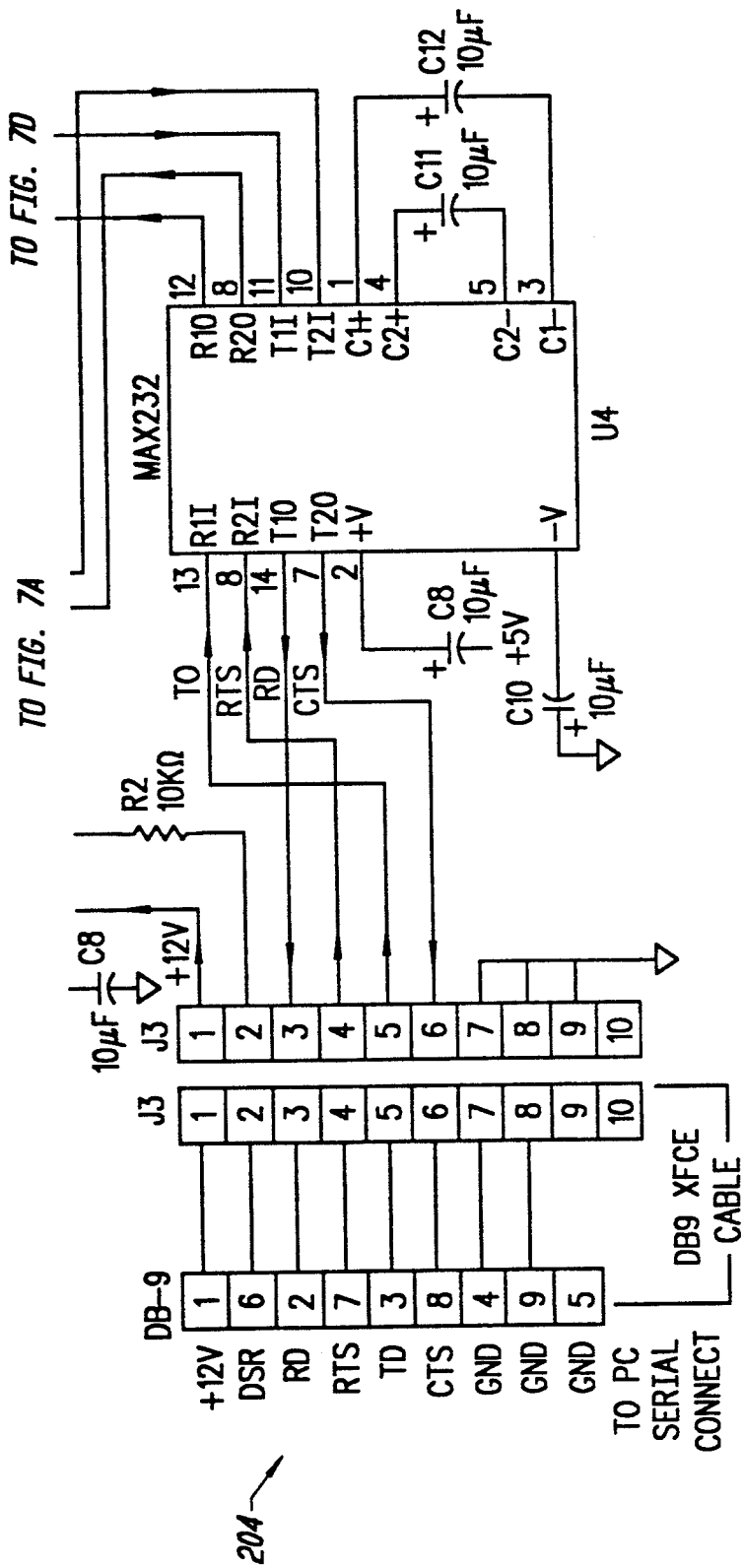
Figure 7D:
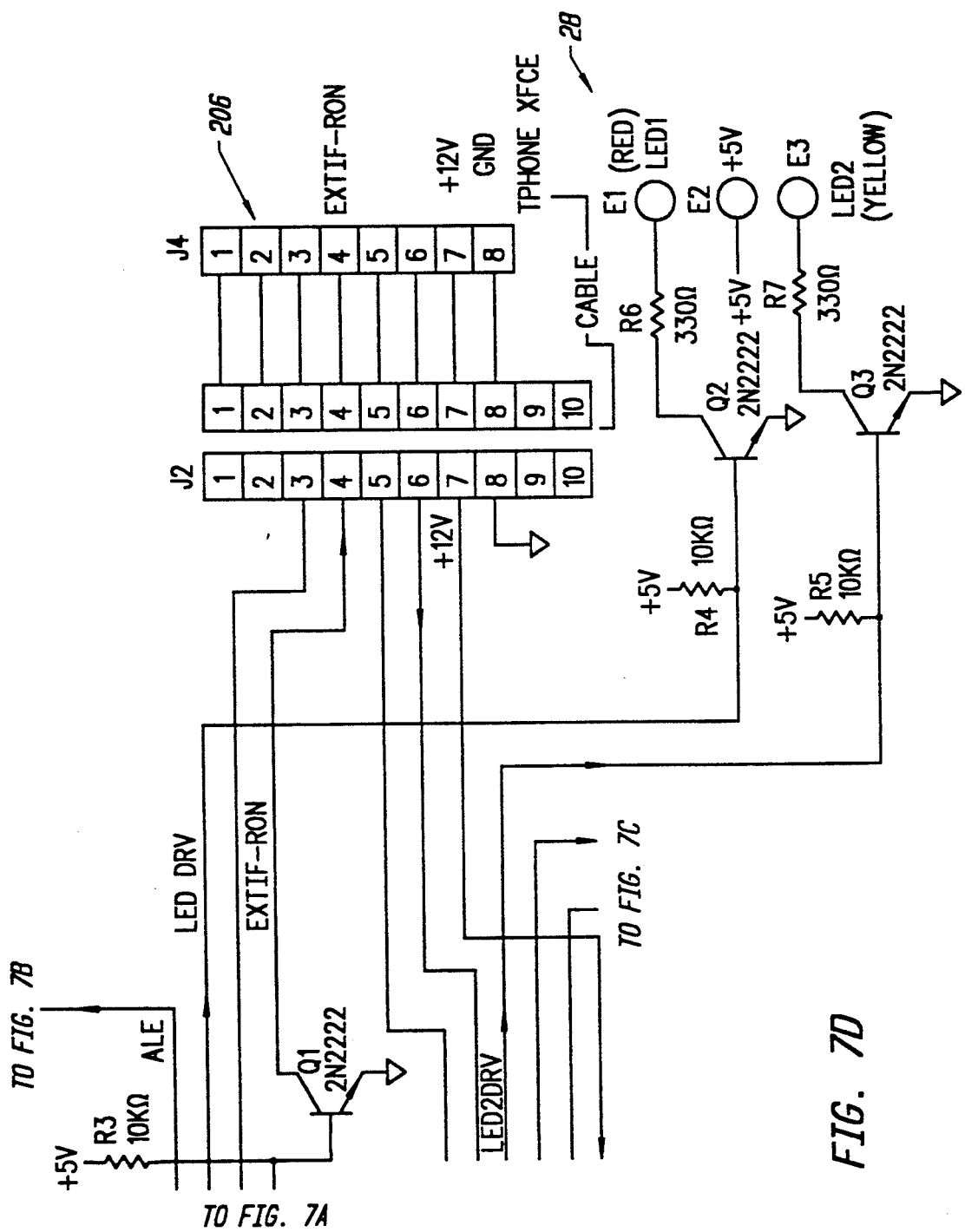

In the example given, modifying a Novatel PTR800A phone 208, FIGS. 6 and 8, the program code is not stored in ROM, because there was no room, but stored in a dedicated section of RAM. In operation, as described with reference to the flow charts, patches were used to jump out of ROM to RAM to implement the new program procedures. Similarly, certain features of the original phone, including a user call memory in RAM for storage of frequently called numbers, was coopted to store the new phone call data.

A redesigned cellular phone unit 12 preferably allocates system operation code to ROM, and includes an expanded RAM memory to retain common desirable features, while storing data on an expanded number of logged calls with the additional data for time and date provided by the incorporated real-time clock, and a correlated real-time record of (SID) data to establish the location of the phone during each logged call, and if desired, throughout its period of use.

With reference to FIG. 6, it may be observed that block diagram generally describes the interlink receiver 28. Receiver 28 is mounted within boot 32 which includes a microprocessor 202 communicating through a serial port 204 to the central processing unit 14. Interface 206 permit telephone unit 208 to communicate with receiver 200. As previously described the embodiment herein employs a telephone unit consisting of a Novatel cellular phone TR800A. However, it should be noted that any telephone unit may be employed herein with the present system 10. In this regard, translation means 210 is included in receiver 28 to establish a protocol within receiver 28, permitting data signals from telephone unit 208 to eventually reach central processing unit (CPU) 14 through microprocessor 202, using standard data formats such as ASCI. The program 212, in the form of software or firmware, is inserted into translation means 210 to accommodate the data signal characteristics of telephone unit 208. It should be noted that translation means 210 may be erasable and reprogramable with any program when telephone units are substituted.

Returning now to FIGS. 7A-7D, it may be observed that a schematic diagram is represented for receiver 28. At it may seen from FIGS. 7A-7D interface 204 from central processing unit 14 feeds into receiver 28 at J3. A 12 V DC power source is also fed from CPU 14 passes through capacitor C8 and into voltage regulator VR1. The voltage regulator VRI reduces the input voltage from 12 V to 5 V by passing current through an output filter 214 consisting of capacitors C1, C2, C9, C4, and C13. The J3 input connects to process voltage convertor U4 which is capable of generating positive and negative voltages via capacitors C8, C10, C11, and C12. Microprocessor U1 interprets any data, as previously described, passing between CPU 14 and telephone unit 208. Multiplexer U2 receives signal lines from U3, depicted as an EPROM which serves as translation means 210. Software or firmware program 212 is superimposed on EPROM 3. The source code of a software program peculiar to the Novatel telephone unit 208 is enclosed herewith as an appendix to this application. Interface 206, also peculiar to the Novatel telephone unit 208, is depicted in FIGS. 7A-7D as J4. Again, the physical terminal or jack serving as interface 206 may be altered to accommodate any telephone unit. E1 (LED 1) is switched by transistor Q2 and indicates the operation transistor Q3 operates transistor E3 (LED 2) with a yellow light indicating interrogation between CPU 14 and telephone unit 208. Transistor Q1 turns telephone unit 208 on and off. Table 1 indicates components and abbreviations employed in FIGS. 7A-7D and 8.

With reference to FIG. 8, it may be observed that a portion of the circuit board added to the Novatel PTR800A phone unit 208 is depicted. The EPROM U6 essentially identical to the EPROM employed in the Novatel phone unit 209 except the tip missing 216 pin (−) has been removed. A clock chip U5 has been added, including a crystal Y2. Thus, the clock/calendar information travels between the pins marked VCC of chips U5 and U6 via the tuning capacitor C14. Thus, the unit 208 has been altered to provide clock/calendar information, together with prior information available in phone unit 208, to interlink receiver 28 and CPU 14. Table 2 represents a list of certain components employed in the schematics depicts in FIGS. 7A–7D and 8. It should be noted that additional software or firmware is programmed into the EPROM of U6 and is provided herein as a portion of the appendix.

TABLE I

| ABBREVIATIONS | |
|---|---|
| XTAL | — crystal |
| PSEN | — program strobe |
| P | — port |
| RST | — reset |
| DSR | — data set ready |
| RD | — receive data |
| RTS | — ready to send |
| TD | — transmit data |
| CTS | — clear to send |
| GND | — ground |
| DB | — connector |
| OE | — output enable |
| VPP | — power supply chip |
| O | — out |
| E | — enable |
| PCRXT | — pers. computer receive data |
| PCTXD | — pers. computer transmit data |
| ALE | — address latch enable |
| A | — address |
| LED | — light emitting diode |
| AD | — address and data line |
| DRV | — drive |
| WRON | — telephone unit |
| XFCE | — interface |
| CE | — chip enable |
| PGM | — program |
| I | — in |
| D | — data |

TABLE II

| COMPONENTS | |
|---|---|
| U-1 | Microprocessor 80C31 |
| U-2 | Multiplexer 74 HC 373 |
| U-3 | EPROM 27064 |
| U-4 | Process Voltage Converter Maxum 232 |
| U-5 | Clock Chip DS1215S Dallas Semi Conductors, Dallas Texas |
| U-6 | EPROM 27C2S56 |
| Telephone Unit 208 Novatel PTR800A Ft. Worth, Texas | |

In use, in the situation of a rental operation, a customer indicates a desire to rent a cellular phone and presents a credit card. The rental agent activates the display screen by a key touch to change from a screen saver display to a main menu, selecting the "rent a phone" option. The agent then selects a "new customer" option and enters the customers name, address, driver's license number and other information desired by a predevised field based data format. The agent then swipes the customer's credit card through the slot in the credit card reader to record credit information and automatically dial-up a service bureau through a dedicated internal modem in the local computer, called the tracking and accounting unit (TAU). Upon verification of card validity and credit limitations, if any, the TAU prompts the agent to place a phone in the boot of the telephone interlink receiver. The phone is initially off and the interlink receiver powers the phone, unlocks it, and checks the phone Electronic Serial Number (ESN) and telephone number, checks the cumulative call counter, checks the setting of the real-time clock in the phone and resets the call memory.

The TAU prints out the rental agreement, which in part is preprinted, adding the new information identifying the customer and phone being rented, the number of batteries provided, and any other transaction or credit information desired. The customer signs the agreement and a copy is retained by the agent who logs the phone as in-use.

The phone for rental operations may have international, 900 and 876 numbers blocked. Additionally, the phone may have the number of calls limited by customer agreement, or because of memory capacity is storing the time of the call, the duration, the called number for outgoing calls, and the SIDH number, identifying the cellular system area called from. A conventional cellular phone without specifically added memory can store data on about 200 calls.

After use, the customer returns the phone to the rental site. The agent selects the "phone return" option in the screen display menu. The agent is again prompted to place the phone in the boot of the telephone interlink receiver. The interlink receiver reads the call memory, clears the call memory, locks the phone and transfers the information to the TAU.

The TAU calculates the bill, using the appropriate daily rate, local calling charge, roaming charges, roaming call surcharges, long distance tariffs, long distance markups, international rates, taxes and any other charges such as lost batteries, etc. The TAU calls the credit card service bureau and requests payment authorization. The TAU prints out a Final Agreement Invoice with a detailed call list, and list of charges for the customer. When the customer signs the invoice, the TAU records the rental as complete.

Periodically, under central operator control, the centralized information processor calls the local site TAU over a dial-up line. The centralized processor polls the TAU for records of all completed rentals, inventory data and provides the TAU with tariff and other operating data updates. The polling of local site TAUs is usually performed late-at-night as the TAU is disabled during interrogation. The centralized processor compiles and prints daily and weekly reports on individual sites, recording daily and weekly business, phone usage, inventory, overdue phones and revenues. The centralized processor compiles composite reports on all site data to provide a current overview of the rental operation.

Similarly, the TAU on operator demand generates reports for the individual rental office to provide current and cumulative hard copy records on the business.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

We claim:

1. A cellular telephone accounting system comprising:
   a) a central processing unit;

b) at least one cellular telephone unit for making telephone calls, the cellular telephone unit having a real-time clock chip;
c) a telephone interlink receiver employed in conjunction with the telephone unit and the central processing unit with communication means for communicating between the telephone unit and the central processing unit, the interlink receiver communication means including,
  1) a microprocessor in the interlink receiver;
  2) interface means in the interlink receiver for interfacing the telephone unit with said microprocessor and receiving data signals from the telephone unit;
  3) communicating means for interfacing the central processing unit with the microprocessor, including a port recognizable by the central processing unit, and receiving data signals from the microprocessor, wherein data signals are received by said microprocessor from the telephone unit and data signals are received by the central processing unit from said microprocessor; and
  4) translation means for establishing protocol relative to data signals received from the telephone unit to permit communication of said telephone unit data signals to said microprocessor and to the central processing unit, wherein said translation means includes a program and wherein the telephone unit has call identification and recording means for identifying telephone calls and the time, date and duration of telephone calls as clocked by the real-time clock chip made from the telephone unit with identifying call data and recording the identifying call data in the telephone unit, wherein the telephone interlink receiver communicates the identifying call data to the central processing unit for accounting.

2. The receiver of claim 1 in which said program may be erasably inserted into said translation means.

3. The receiver of claim 1 which additionally comprises means for transmitting electrical power from the central processing unit to the telephone unit.

4. The receiver of claim 3 which additionally comprises means for switching said electrical power from the central processing unit to the telephone unit.

5. The receiver of claim 1 which additionally comprises a visual indicator of any activation of said means for receiving signals from the telephone unit.

6. A cellular telephone tracking and accounting system comprising:
  a) a plurality of mobile cellular phone units, each unit having an internal real-time clock and calendar circuit, a memory, and, programmed system operating means for storing data on calls and the time and date of the calls in the memory;
  b) a plurality of central processor units each central processor unit associated with a local site and each having a plurality of cellular phone units associated with the local site central processor;
  c) interlink means for connecting the mobile cellular phone units to its local site central processor unit, wherein the stored data on calls and the time and date of the calls is transferrable to the central processor unit; and
  d) a centralized processor connectable with each central processor unit with means for polling each central processor unit to extract data for centralized record keeping and operations management;
  e) means for initiating transfer of the stored data from the cellular phone units to the central processor units and from the central processor units to the centralized processor.

7. The cellular telephone tracking and accounting system of claim 6 wherein the interlink means comprises an electric terminal connection between the cellular phone unit and the central processor unit.

8. The cellular telephone tracking and accounting system of claim 7 wherein the interlink means includes programmed circuit means for translating communications between the phone unit and the central processor unit.

9. The cellular telephone tracking and accounting system of claim 6 wherein the phone unit includes programmed system operating means for storing the data on calls and data on system identification numbers in memory and transferring the system identification number data with the call data to the central processing unit.

10. The cellular telephone tracking and answer system of claim 6 comprising further, a credit card reader and means for recording credit card data in the central processing unit.

11. The cellular telephone tracking and answer system of claim 10 comprising further a printer means for printing check-out data on phone units dispensed to a user and printing check-in data of phone units returned from a user.

12. The cellular telephone accounting system of claim 1 wherein the identifying call data includes the telephone number of each call made with the cellular telephone unit, and the system identification number of each call made.

13. The cellular telephone accounting system of claim 12, wherein the cellular telephone unit has telephone unit identification data including data identifying the electronic serial number identifying a particular phone unit, and a home system identification number identifying a particular phone unit as associated with a particular cellular area, wherein the telephone interlink receiver receives the telephone unit identification data and communicates the telephone unit identification data to the central processing unit.

14. The cellular telephone accounting system of claim 13 wherein the identifying call data includes the telephone numbers of each call made from the cellular telephone unit, and the system identification number of the location of each call.

15. The cellular telephone accounting system of claim 14 wherein the identifying call data includes the time and date of incoming calls to the cellular telephone unit.

16. The cellular telephone accounting system of claim 1 wherein the central processing unit has program means for calculating an accounting invoice from the identifying call data communicated to the central processing unit by the telephone interlink receiver.

17. The cellular telephone accounting system of claim 13, wherein the central processing unit has program means for calculating roaming charges from the system identification number of each call made from the telephone unit and the home system identification number of the telephone unit.

18. The cellular telephone accounting system of claim 16 including a credit card reader connected to the central processing unit for reading a credit card and determining a card's credit, wherein the program means of the central processing unit charges the calculated accounting invoice against the credit of the credit card read.

* * * * *